United States Patent [19]

Andersson

[11] 4,234,343
[45] Nov. 18, 1980

[54] STRUCTURAL SILICON NITRIDE MATERIALS CONTAINING RARE EARTH OXIDES

[75] Inventor: Clarence A. Andersson, Pittsburgh, Pa.

[73] Assignee: The United States of America as represented by the United States Department of Energy, Washington, D.C.

[21] Appl. No.: 1,033

[22] Filed: Jan. 4, 1979

[51] Int. Cl.$^3$ .................. C04B 35/50; C04B 35/58
[52] U.S. Cl. .................. 106/73.2; 106/73.4; 106/73.5
[58] Field of Search .................. 106/73.2, 73.5, 73.4

[56] References Cited

U.S. PATENT DOCUMENTS

| | | | |
|---|---|---|---|
| 3,969,125 | 7/1976 | Komeya | 106/73.2 |
| 4,046,580 | 9/1977 | Ishii et al. | 106/73.2 |
| 4,102,698 | 7/1978 | Lange et al. | 106/73.2 |
| 4,113,830 | 9/1978 | Mazdiyasni et al. | 106/73.2 |

OTHER PUBLICATIONS

Huseby et al.; "Influence of Various Densifying Additives on Hot Pressed $Si_3N_4$", Powder Metallurgy International, 6 No. 1, Feb. 1974, pp. 17–19.

Priest et al., "Sintering of $Si_3N_4$ Under High Nitrogen Pressure" J. Am. Ceramic Soc. Jan.-Feb., 1977, p. 81.

Mazdiyasni et al., "Consolidation, Microstructure and Mechanical Properties of $Si_3N_4$ Doped with Rare Earth Oxides", J. Am. Ceramic Soc., Dec. 1974, pp. 536–537, 57, No. 12.

Bazza; "Hot-Pressed $Si_3N_4$," J. Am. Ceramic Soc. 56, No. 12, p. 662.

Primary Examiner—O. R. Vertiz
Assistant Examiner—Mark Bell
Attorney, Agent, or Firm—James E. Denny; Stephen D. Hamel; Allen H. Uzzell

[57] ABSTRACT

A ceramic composition suitable for use as a high-temperature structural material, particularly for use in apparatus exposed to oxidizing atmospheres at temperatures of 400 to 1600° C., is found within the triangular area ABCA of the $Si_3N_4$—$SiO_2$—$M_2O_3$ ternary diagram depicted in FIG. 1. M is selected from the group of Yb, Dy, Er, Sc, and alloys having Yb, Y, Er, or Dy as one component and Sc, Al, Cr, Ti, (Mg +Zr) or (Ni+Zr) as a second component, said alloy having an effective ionic radius less than 0.89 Å.

7 Claims, 2 Drawing Figures

STRUCTURAL SILICON NITRIDE MATERIALS CONTAINING RARE EARTH OXIDES

BACKGROUND OF THE INVENTION

This invention was made in the course of, or under, a contract with the U.S. Department of Energy.

It relates to high-temperature corrosion-resistant materials and more specifically to hot pressed $Si_3N_4$ ceramics containing oxide densification aids. Densification aids in the $Si_3N_4$ system function during hot pressing via the formation of a liquid phase which dissolves $Si_3N_4$ and acts as a transport medium during the pressing operation, resulting in a reduction in porosity. During cool-down $Si_3N_4$ and other phases precipitate from the liquid phase. In the prior art a number of compounds have been suggested as densification aids for $Si_3N_4$, such as $CeO_2$, $MgO$, $Mg_3N_2$, $Al_2O_3$, and a number of rare earth oxides. A number of possible densification additives for $Si_3N_4$ were screened as described by I. C. Huseby and Petzow in the article "Influence of Various Densifying Additives on Hot Pressed $Si_3N_4$," *Powder Metallurgy International*, Vol. VI, February 1974, pp. 17-19. Of the materials tested $Ce_2O_3$, $CeO_2$, $MgO$, and $La_2O_3$ were found to be the most effective as additives, while $Gd_2O_3$, $Yb_2O_3$, and $BeO$ were said to be of medium effectiveness. A number of other additives were said to be of no benefit.

In U.S. Pat. No. 4,102,698 to Frederick F. Lange, et al., for "Silicon Nitride Compositions in the $Si_3N_4$-$Y_2O_3$-$SiO_2$ System," issued July 25, 1978, it was reported that $Y_2O_3$, when used as a densification additive in a specified area of the $Si_3N_4$-$SiO_2$-$Y_2O_3$ ternary diagram results in enhanced corrosion resistance with respect to other $Si_3N_4$ compositions containing $Y_2O_3$. This corrosion resistance was attributed to the elimination of detrimental secondary phases which are readily oxidized. The ceramics fabricated in the $Si_3N_4$, $Si_2N_2O$, and $Y_2Si_2O_7$ phase field were found to contain no unstable phases.

SUMMARY OF THE INVENTION

It is an object of this invention to provide $Si_3N_4$-based ceramic compositions suitable for use in high temperature oxidizing environments, such as gas turbine, etc., which have improved oxidation resistance in combination with comparable or improved mechanical strength, relative to prior art compositions containing $SiO_2$ and $Y_2O_3$.

It is a further object to provide an improvement in articles of manufacture having a component intended for use in an oxidizing atmosphere at a temperature in excess of 400° C.

These and other objects are achieved according to this invention in a ceramic composition suitable for use as a high-temperature structural material, said composition being within the triangular area defined by the points ABCA of the $Si_3N_4$-$SiO_2$-$M_2O_3$ ternary diagram depicted in FIG. 1, M being selected from the group consisting of Yb, Dy, Er, Sc, and alloys having Yb, Dy, Er or Y as a first component, and Sc, Al, Cr, Ti, (Mg+Zr) or (Ni+Zr) as a second component said alloy having an effective ionic radius less than 0.89 Å.

DETAILED DESCRIPTION

Figure 1:
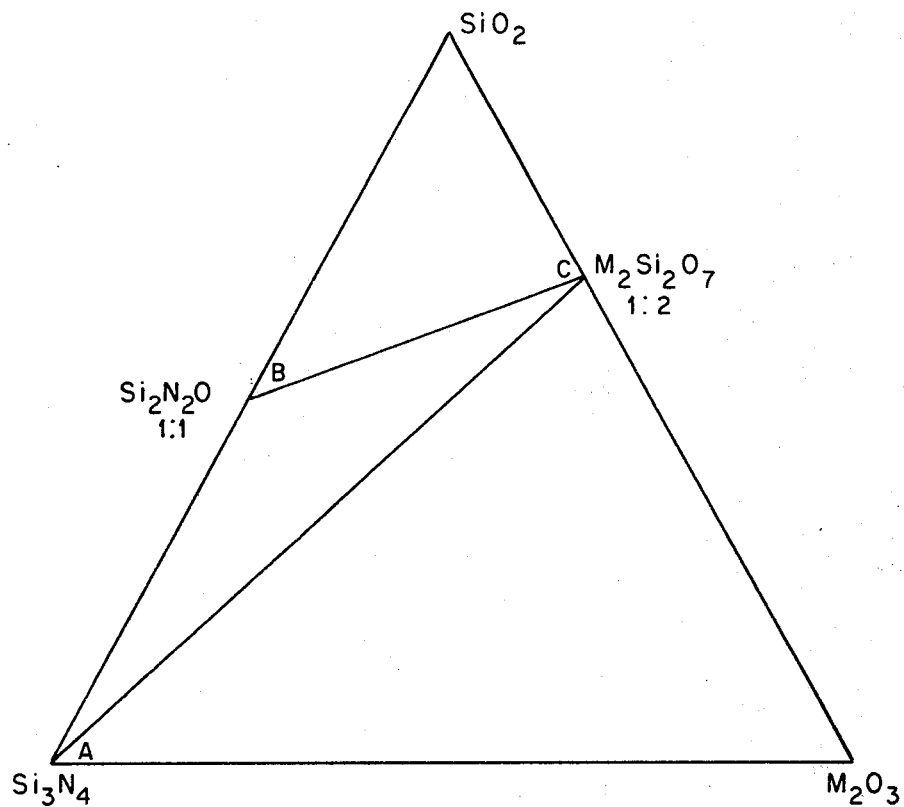
FIG. 1 is a ternary $Si_3N_4$-$SiO_2$-$M_2O_3$ diagram. Area ABCA represents the phase field in which corrosion resistance is achieved according to the present invention.

The oxidation resistance within the ABCA compatibility triangle in the $Si_3N_4$-$SiO_2$-$Y_2O_3$ system is attributable to the fact that the triangle is bounded by points $Y_2Si_2O_7$ and $Si_2N_2O$, both fully oxidized compositions. It is believed that the corrosion resistance of $Si_3N_4$ in oxygen-containing atmospheres is due in part to the formation of a passivating $SiO_2$ surface upon exposure to oxygen, especially at high temperatures. According to this invention, it has been found that $Y_2O_3$ is not unique in its ability to impart improved strength to $Si_3N_4$ while retaining a significant measure of corrosion resistance. It has been found that certain of the rare earth oxides when added to $Si_3N_4$, also demonstrate the formation of a stable $M_2Si_2O_7$ phase during hot pressing. In some of the rare earth oxide $Si_3N_4$-$SiO_2$ systems, the secondary phase formed upon cool-down is glassy. A glassy phase is believed to flow at high temperatures causing grain boundary sliding and slow crack growth in $Si_3N_4$-based ceramics. Several of the rare earth oxides, however, were found to result in a crystalline $M_2Si_2O_7$ phase which provides a significant increase in strength. Certain of these rare earth oxides which form crystalline $M_2Si_2O_7$ boundary phases in the $Si_3O_4$-$SiO_2$ system have quite high liquid phase temperatures (temperature of incipient melting) which permits mechanical strength retention at high use temperatures.

Based upon a survey of eleven rare earth and yttrium oxides, it has been discovered that the highest strength and highest incipient melting points are achieved in those $Si_3O_4$-$SiO_2$-$M_2O_3$ ceramic systems in which the M component has an ionic radius less than about 0.93 Å which is close to that of yttrium ($Y^{+3} = 0.89$ Å).

In order to determine whether additives other than $Y_2O_3$ could result in the formation of the desirable $M_2Si_2O_7$ phase and provide excellent high temperature mechanical properties and corrosion resistance, rare earth oxides and yttrium oxide additives were investigated for both crystallinity and for the incipient melting points of the lowest melting phase. The test compositions were selected to produce 50 mole percent $Si_3N_4$—50 mole percent $M_2Si_2O_7$, and 33 mole percent $Si_3N_4$—33 mole percent $Si_2N_2O$—33 mole percent $M_2Si_2O_7$. The mixtures were ball milled and cold pressed into pellets $\frac{3}{8}$ inch diameter $\times \frac{1}{4}$ inch thick. A 1/16 inch diameter by $\frac{1}{4}$ inch deep sight hole was radially drilled into each pellet. The pellets were individually inductively heated using a molybdenum susceptor in argon gas until melting occurred. Temperatures were continuously monitored. The incipient melting temperatures are given in the upper portion of FIG. 2, and are the average of the initial melting temperatures of the two compacts. In some cases only the exterior of the pellet underwent melting, and on subsequent examination the pellets were shown not to have melted in the region of the drilled sight hole. The upward arrows indicate these compositions. Of the specimens heated, those prepared with Nd, Sm, Gd, Dy, and Pr had poor or very poor crystallinity and contained glassy phases in at least one sample. Those specimens prepared with Sc, Y, La, and Ce contained $M_2Si_2O_7$ phases with good crystallinity.

The best crystallinity was observed in those specimens prepared with Yb and Er oxides. The composition prepared with $Yb_2O_3$ contained both $Yb_2Si_2O_7$ (major) and $Yb_2SiO_5$ (minor), indicating that the short duration of the test did not allow equilibrium to be established.

A number of $Si_3N_4$ flexural specimens were prepared from eleven rare earth oxides and from $Cr_2O_3$, NiO, and $ZrO_2$ which are of possible utility as pressing aids. Mixing and particle size reduction of powders were accomplished by ball milling them with tungsten carbide milling media and a liquid such as tert-butanol or methanol in polyethylene jars. The $Si_3N_4$ used was from a single lot of high purity powder containing less than 200 ppm Ca, less than 0.6 wt.% oxygen and having an overall purity of 99%. Hot pressing was accomplished in a conventional clamshell hot press in a nitrogen or argon atmosphere, at a slightly positive pressure. Pressures of 4000–5000 psi, were applied to graphite dies which were inductively heated to temperatures between 1750° and 1800° C. Compaction was monitored by externally measuring ram travel. Pressing times were those required for completion (ram travel rate approaching zero) and ranged from a minimum of 2 hours to a maximum of 4 hours. The resulting discs were 2 inches in diameter by 0.3 inch thick. Test specimens were sliced from the pressed disc to provide specimens of about 0.250×0.125×1.25 inches. The tensile stressed surfaces were ground parallel to the tensile direction with a 325 mesh diamond wheel. Flexural testings were performed in an instron Universal test machine at a crosshead speed of 0.002 in./min. The room temperature test fixtures had inner and outer spans measuring 0.250 inch and 0.750 inch, respectively. The $Si_3N_4$ elevated temperature test fixtures had spans of 0.375 inch and 0.875 inch. The rare earths oxide compositions are depicted in Table I. All the rare earths with the exception of Sc provided sufficient liquid to allow densification under the hot pressing temperatures and pressures used. Due to their higher incipient melting points the $Sc_2O_3$-containing compositions require higher hot pressing temperatures and pressures. As shown in Table I, the compositions $Dy_2O_3$, $Er_2O_3$, $Yb_2O_3$ provided excellent flexural strength at both room temperature and 1400° C. It is not presently understood why the $Dy_2O_3$ additive exhibited such good mechanical properties since the binder phase should have been glassy as indicated by melting tests. It is believed that a crystalline phase was actually produced during the hot pressing operation which was of longer duration than the above-described melting point experiment. The $Cr_2O_3$, $NiO_2$, and $ZrO_2$ did not prove useful as densification aids in combination with $SiO_2$. Each of these systems had free or liquid $SiO_2$ at the hot pressing temperature which reacts with the $Si_3N_4$ to form solid $Si_2N_2O$, providing no liquid phase sintering or densification.

TABLE 1

Compositions and Flexural Strengths of Silicon Nitride Hot-Pressed with Metal Oxide-Silica Additions

| | Mole Fraction | | | Calculated Mole Fraction | | Percent Theoretical Density | Flexural Strengths, ksi | | | | | |
|---|---|---|---|---|---|---|---|---|---|---|---|---|
| | | | | | | | Room Temperature | | | 1400° C. | | |
| Metal | $Si_3N_4$ | $M_2O_3$ | $SiO_2$ | $Si_3N_4$ | $M_2Si_2O_7$ | | Avg. | High | Low | Avg. | High | Low |
| Sc | .9000 | .0333 | .0667 | .9643 | .0357 | 92 | | | | | | |
| Sc | .8000 | .0667 | .1333 | .9230 | .0770 | 85 | | | | | | |
| La | .8000 | .0667 | .1333 | .9230 | .0770 | 98 | 62 | 89 | 14 | 39 | 51 | 31 |
| La | .9000 | .0333 | .0667 | .9743 | .0357 | 93 | 92 | 109 | 84 | 36 | 49 | 24 |
| Ce | .8000 | .0667* | .1333 | .9230 | .0770 | 100 | 50 | 100 | 17 | 52 | 53 | 50 |
| Pr | .8043 | .0652 | .1305 | .9250 | .0750 | 100 | 72 | 90 | 62 | 39 | 41 | 38 |
| Nd | .8000 | .0667 | .1333 | .9230 | .0770 | 100 | 101 | 107 | 94 | 51 | 56 | 42 |
| Sm | .8000 | .0667 | .3333 | .9230 | .0770 | 98 | 78 | 88 | 71 | 33 | 40 | 26 |
| Gd | .8043 | .0652 | .1305 | .9250 | .0750 | 100 | 100 | 108 | 66 | 42 | 51 | 38 |
| Dy | .8953 | .0349 | .0698 | .9625 | .0375 | 95 | 109 | 115 | 88 | 58 | 71 | 51 |
| Dy | .8000 | .0667 | .1333 | .9230 | .0770 | 100 | 114 | 134 | 100 | 66 | 77 | 55 |
| Er | .8043 | .0652 | .1305 | .9250 | .0750 | 100 | 61 | 94 | 23 | 56 | 70 | 43 |
| Yb | .8043 | .0652 | .1305 | .9250 | .0750 | 100 | 110 | 117 | 101 | 81 | 102 | 70 |
| Yb | .8636 | .0455 | .0909 | .9500 | .0500 | 100 | 111 | 122 | 102 | 68 | 73 | 66 |

*Calculated from equivalent $CeO_2$ content: $2 CeO_2 \rightarrow Ce_2O_3 + \frac{1}{2} O_2$.

Table 2 depicts a comparison of the flexural strengths of $Si_3N_4$-$SiO_2$-$M_2O_3$ ceramics prepared with Yb, Dy, and Er of this invention compared with ceramics prepared with approximately molar equivalent amounts of the prior art $Y_2O_3$.

TABLE 2

| | Mole Fraction | | Theoretical Density | Flexural Strengths (ksi) | | | | | | Percent Improvement* |
|---|---|---|---|---|---|---|---|---|---|---|
| | | | | Room Temperature | | | 1400° C. | | | |
| Oxide | $Si_3N_4$ | $M_2SiO_2$ | | Avg. | High | Low | Avg. | High | Low | |
| Y | .9230 | .0770 | 99 | 94 | 103 | 86 | 61 | 69 | 54 | |
| Yb | .9250 | .0750 | 100 | 110 | 117 | 101 | 81 | 102 | 70 | 33 |
| Er | .9250 | .0750 | 100 | 61 | 94 | 23 | 56 | 70 | 43 | |
| Dy | .9230 | .0770 | 100 | 114 | 134 | 100 | 66 | 77 | 55 | 8 |
| Y | .9444 | .0556 | 99 | 113 | 126 | 100 | 60 | 67 | 56 | |
| Yb | .9500 | .0500 | 100 | 111 | 122 | 102 | 68 | 73 | 66 | 13 |
| Er | (not tested) | | | | | | | | | |
| Dy | .9625 | .0375 | 95 | 109 | 115 | 88 | 58 | 71 | 51 | |

*Relative to $Y_2O_3$, average at 1400° C.

A series of oxidation tests were performed on the broken flexure bars which had been used to measure room temperature flexural strengths. One group of bars was placed in a furnace in air at 1000° C. and another group was placed in another furnace at 1400° C. Both groups were heated for extended periods. The specimens were periodically withdrawn to determine intermediate mass gains and weighed on a balance with an accuracy of about ±0.0003 gram. The results are depicted in Table 3. The Kp values for material containing MgO were based upon short term tests. The Kp values for pure $Si_3N_4$ were based on values reported in the literature. It is seen from the oxidation rates for the Dy, Er, and Yb-containing specimens that they are unexpectedly corrosion resistant. At 1400° C. the Dy, Er, and Yb compositions of this invention demonstrate oxidation rate constants which appear to be a factor of ten smaller than that of the compositions prepared with $Y_2O_3$. It should be noted, however, that at these extremely low oxidation rates, the mass changes were aproaching the limits of accuracy of the weighing technique. Nevertheless, the compositions containing Dy, Er, and Yb have oxidation rates which lie within the range of the intrinsic rates of pure $Si_3N_4$, about $10^{-15}$ to $10^{-13}$ $g^2$ $cm^{-4}$ $s^{-1}$.

solid solution pyrosilicate with $Si_3N_4$ prior to hot pressing.

The addition of alloy oxides to $Si_3N_4$-$SiO_2$ mixtures causes the formation of the densification aid phase $(M'_{1-x}M''_x)_2Si_2O_7$ upon hot pressing, which can have a unit cell size smaller than $Y_2Si_2O_7$ or $Yb_2Si_2O_7$ and thereby demonstrate enhanced mechanical properties and higher incipient melting temperature. In addition, the high temperatures and pressures required to hot press $Si_3N_4$ compositions containing $Sc_2O_3$ can be reduced by alloying Sc with metals having a slightly larger ionic radius.

The compositions of this invention lie in the region ABCA of the $Si_3N_4$-$SiO_2$-$M_2O_3$ diagram where M is selected from the group of Yb, Dy, Er, Sc, and alloys

TABLE 3

| Metal | Mole Fraction | | | Calculated Mole Fraction | | Oxidation Rate Constants, $K_p$,* $g^2$ $cm^{-4}$ $s^{-1}$ | |
|---|---|---|---|---|---|---|---|
| | $Si_3N_4$ | $M_2O_3$ | $SiO_2$ | $Si_3N_4$ | $M_2Si_2O_7$ | 1000° C. 599 hour test in air | 1400° C. 769 hour test in air |
| La | .8000 | .0667 | .1333 | .9230 | .0770 | $5.5 \times 10^{-15}$ | $7.7 \times 10^{-14}$ |
| La | .9000 | .0333 | .0667 | .9743 | .0357 | $8.3 \times 10^{-15}$ | $1.3 \times 10^{-14}$ |
| Ce | .8000 | .0667** | .1333 | .9230 | .0770 | $3.2 \times 10^{-15}$ | $2.3 \times 10^{-15}$ |
| Pr | .8043 | .0652 | .1305 | .9250 | .0750 | $1.3 \times 10^{-16}$ | $7.1 \times 10^{-15}$ |
| Nd | .8000 | .0667 | .1333 | .9230 | .0770 | $5.2 \times 10^{-15}$ | $4.8 \times 10^{-15}$ |
| Sm | .8000 | .0667 | .3333 | .9230 | .0770 | $5.7 \times 10^{-15}$ | $1.3 \times 10^{-14}$ |
| Gd | .8043 | .0652 | .1305 | .9250 | .0750 | $6.6 \times 10^{-15}$ | $9.3 \times 10^{-15}$ |
| Dy | .8953 | .0349 | .0698 | .9625 | .0375 | $2.5 \times 10^{-15}$ | $5.5 \times 10^{-15}$ |
| Dy | .8000 | .0667 | .1333 | .9230 | .0770 | $3.3 \times 10^{-15}$ | $7.6 \times 10^{-16}$ |
| Er | .8043 | .0652 | .1305 | .9250 | .0750 | $5.3 \times 10^{-15}$ | $2.0 \times 10^{-15}$ |
| Yb | .8043 | .0652 | .1305 | .9250 | .0750 | $6.1 \times 10^{-16}$ | $3.8 \times 10^{-15}$ |
| Yb | .8636 | .0455 | .0909 | .9500 | .0500 | $6.6 \times 10^{-16}$ | $2.4 \times 10^{-15}$ |
| Y*** | .8000 | .0667 | .1333 | .9230 | .0770 | $7.1 \times 10^{-15}$ | $2.17 \times 10^{-14}$ |
| Y*** | .8500 | .0550 | .1000 | .9444 | .0556 | $6.9 \times 10^{-16}$ | $2.0 \times 10^{-14}$ |
| Commercial Hot-Press (MgO) $Si_3N_4$ | | | | | | | $5 \times 10^{-12}$ to $1 \times 10^{-11}$ |
| Pure $Si_3N_4$ | | | | | | $5 \times 10^{-17}$ | $5 \times 10^{-15}$ to $5 \times 10^{-14}$ |

*$K_p = \frac{(\Delta m/A)^2}{t}$ where $\Delta m$ is the increase in mass, A is the surface area, and t is the time.

**Calculated from equivalent $CeO_2$ content: $2CeO \rightarrow Ce_2O_3 + \frac{1}{2} O_2$.

***Tests performed on unbroken test specimens for 1000 hours.

Figure 2:
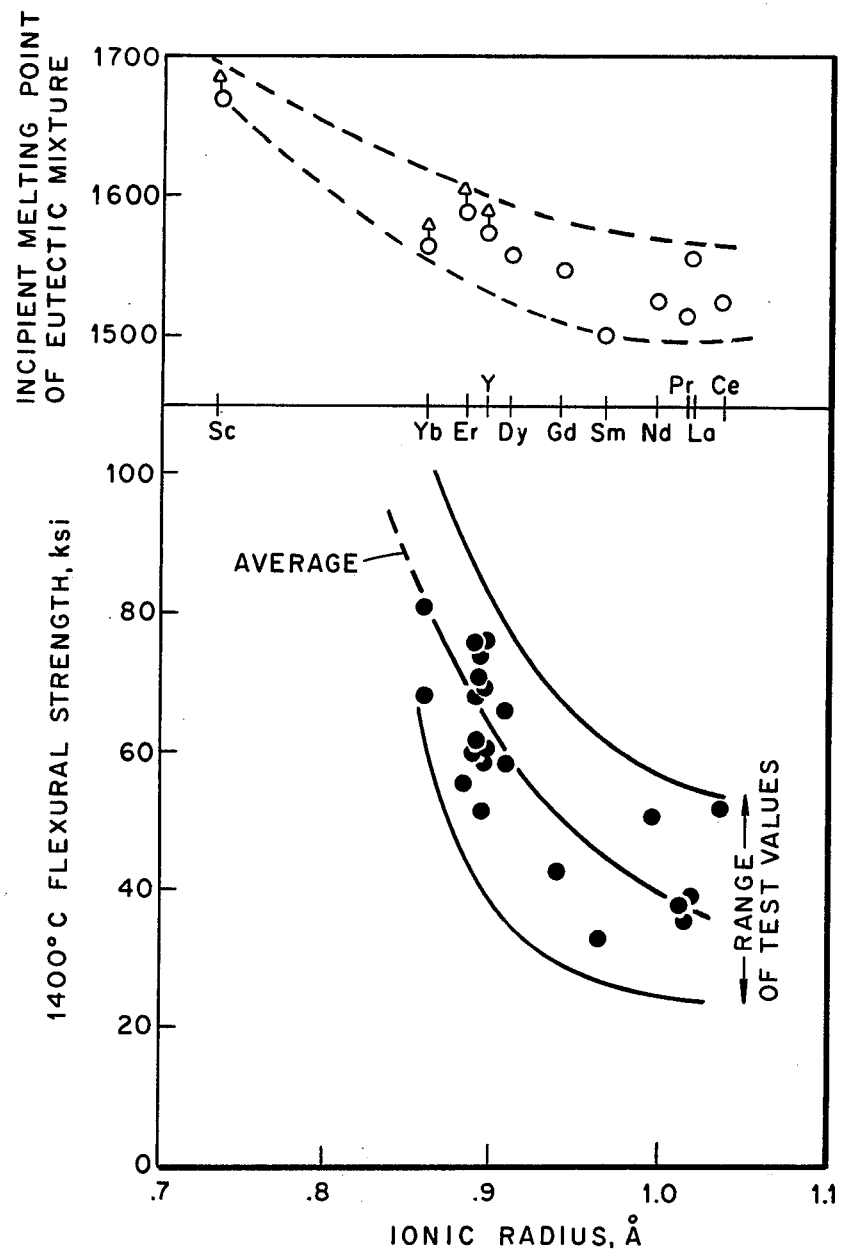
FIG. 2 is a graph depicting the variation of flexural strengths and incipient melting points of $Si_3N_4$ based compositions as a function of the ionic radius of the metal in candidate $Y_2O_3$ and rare earth oxide additives.

It is seen from FIG. 2 that the flexural strengths and incipient melting points of $Si_3N_4$-$Si_2N_2O$-$M_2Si_2O_7$ system are inversely related to the ionic radius of the M component. In particular, those M components which have a metallic ionic radius smaller than that of $Y^{+3}$ (0.89 Å) provide ceramics which exhibit mechanical properties comparable to or superior to those of the prior art materials containing $Y_2O_3$. Ceramics with $Si_3N_4$-$SiO_2$-$Sc_2O_3$ will have significantly higher flexural strengths than even the $Yb_2O_3$-containing ceramic.

Since the flexural strength and incipient melting points of compositions in the $Si_3N_4$-$SiO_2$-$M_2O_3$ system have proven to be so heavily dependent upon the ionic radius of the M component, this invention encompasses compositions in which the M component is an alloy having a first component either trivalent Y, Yb, Dy, or Er and as a second component trivalent Sc, Al, Cr, Ti, or equimolar combinations of divalent and quadrivalent ions such as $(Ni^{+2}+Zr^{+4})$ or $(Mg^{+2}+Zr^{+4})$. For purposes of this invention, the term "alloys" refers to metals in solid solution oxides of the formula $(M'_{1-x}M''_x)_2O_3$, where M' is Y, Yb, Dy, or Er and M" is Sc, Al, Cr, Ti, (Ni+Zr) or (Mg+Zr). Such solid solution oxides can be prepared by thoroughly blending the M' and M" oxides prior to blending with $Si_3N_4$ and $SiO_2$ or by other methods such as coprecipitation of M' and M" salts from solution and subsequent calcining to form the oxide. An alternate procedure is to prepare $(M'_{1-x}M''_x)_2Si_2O_7$ separately, and then to blend this having Yb, Y, Er, or Dy as a first component and Sc, Al, Cr, Ti, (Ni+Zr), or (Mg+Zr) as the second component, said alloy having an effective ionic radius of less than that of $Y^{+3}$, 0.89 Å. It is preferred that the alloy have an effective ionic radius smaller than 0.86 Å (the ionic radius of $Yb^{+3}$). By "effective ionic radius" it is meant the weighted average of the ionic radii of the first and the second alloy components, based upon the values in Table IV.

TABLE IV

| ion | ionic radius (Å) |
|---|---|
| $Y^{+3}$ | 0.89 |
| $Dy^{+3}$ | 0.91 |
| $Yb^{+3}$ | 0.86 |
| $Er^{+3}$ | 0.88 |
| $Sc^{+3}$ | 0.73 |
| $Al^{+3}$ | 0.51 |
| $Cr^{+3}$ | 0.63 |
| $Ti^{+3}$ | 0.76 |
| $Mg^{+2}$ | 0.66 |
| $Ni^{+2}$ | 0.69 |
| $Zr^{+4}$ | 0.79 |

As seen from tables 1, 2 and 3, an especially desirable combination of properties is obtained in the $Si_3N_4$-$SiO_2$-$Yb_2O_3$ system. The greatest strength improvement over the prior art $Y_2O_3$ compositions has been demonstrated in a composition within the molar composition range consisting essentially of about 78-82% $Si_3N_4$, 6-7% $Yb_2O_3$, 12-15% $SiO_2$, however, this may not necessarily be the optimum composition for the $Si_3N_4$ powder used. The optimum composition for a particular lot of $Si_3N_4$ powder may be dependent upon its morphology and the level of impurities. It is preferred that the compositions of this invention consist essentially of the specified components; that is, excluding additional components (other than impurities ordinarily present) in amounts sufficient to materially affect the high temperature strength of the composition.

In general the ceramic compositions of this invention in which M is Yb, Er, or Dy are most easily prepared by hot pressing a blended mixture of $SiO_2$, $Si_3N_4$ and $M_2O_3$ powders at about 4 to 6 ksi at 1750° to 1850° C. for sufficient time, usually 1 to 4 hours to achieve 95 to 100% theoretical density, i.e., the volumetrically weighted average theoretical density of the $Si_3N_3$, $SiO_2$ and $M_2O_3$ components. Compositions containing $Sc_2O_3$ and alloys of $Sc_2O_3$ require higher temperatures and pressures due to the higher incipient melting points.

Mixtures of $Si_3N_4$, $SiO_2$ and $Sc_2O_3$ can be hot pressed in a nitrogen atmosphere at temperatures up to 1850° C. and pressures up to 15 ksi in commercially available graphite fiber reinforced dies. Alternatively, the powder mixture may be hot isostatically pressed. In hot isostatic pressing, the powder is loaded into a suitable canning material such as a welded molybdenum sheet container or a glass envelope selected to have a suitable viscosity at the hot pressing temperature. As is customary in hot isostatic pressing, the filled container is evacuated, sealed, and loaded into the pressure chamber of the press. Pressure is applied by pumps external to the chamber. A temperature of 1850° C. and pressure of 20–40 ksi for 1–2 hours can be used. An advantage of the hot isostatic pressing technique is that the sealed container prevents disassociation of $Si_3N_4$ at the pressing temperature and the containers can be shaped prior to pressing to reduce final machining requirements. The preparation of ceramics containing alloys will be illustrated by the preparation of ceramics in the $Si_3N_4$-$SiO_2$-$(Sc_{1-x}Y_x)_2O_3$ system. Since $Y_2Si_2O_7$ shares a monoclinic structure with $Sc_2Si_2O_7$, complete solid solubility is expected. The same general procedures can be used to prepare other compositions of this invention in which the M component is an alloy. It is well within the skill in the art of ceramics preparation to determine the hot pressing time, temperature, and pressure to prepare any particular composition within the scope of this invention.

The $Si_3N_4$-$SiO_2$-$(Y_{0.5}Sc_{0.5})_2O_3$ alloys can be prepared by mixing suitable quantities of the oxides with the $Si_3N_4$ and allowing the reactions to occur during hot pressing. For example, in order to achieve a 92.5 mole% $Si_3N_4$ + 7.5 mole % $(Y_{0.5}Sc_{0.5})_2Si_2O_7$ material, 3.26 mole % $Sc_2O_3$ + 3.26 mole % $Y_2O_3$ + 13.05 mole % $SiO_2$ (adjusted for the oxygen contained in the $Si_3N_4$) is mixed with 80.43 mole % $Si_3N_4$ and hot pressed. Alternatively, a $(Y_{0.5}Sc_{0.5})_2O_3$ material can be prepared by intimately mixing 50 mole % $Sc_2O_3$ + 50 mole % $Y_2O_3$ and heating to temperatures (e.g., 1500°–1700° C.) sufficient to allow diffusion to occur. 6.52 mole % of the resulting $(Y_{0.5}Sc_{0.5})_2O_3$ is mixed with 13.05 mole % $SiO_2$ and 80.43 mole % $Si_3N_4$ and hot pressed. Still another way of forming $(Y_{0.5}Sc_{0.5})_2O_3$ is to dissolve 50 mole % $ScCl_3$ and 50 mole % $YCl_3$ in water, dry the solution and then heat in air to form the oxide. Again 6.52 mole % $(Sc_{0.5}Y_{0.5})_2O_3$ is mixed with 13.05 mole % $SiO_2$ and 80.43 mole % $Si_3N_4$ and hot pressed. In still another method of preparing the $Si_3N_4$-$SiO_2$-$(M'_{1-x}M''_x)_2O_3$ composition, the alloy pyrosilicate can be prepared first and mixed with $Si_3N_4$ powder before hot pressing. For example, a mixture of 25 mole % $Sc_2O_3$ + 25 mole % $Y_2O_3$ + 50 mole % $SiO_2$ can be melted at temperatures between 1700° and 1800° C., cooled and crushed. 7.5 mole % of the resulting alloy pyrosilicate powder is mixed with 92.5 mole % $Si_3N_4$ and hot pressed. In all cases, the alloy oxide or alloy pyrosilicate/$Si_3N_4$ mixtures hot pressed in the same manner as the compositions containing $Si_3N_4Sc_2O_3$-$SiO_2$.

Having demonstrated the exceptional strength and high temperature oxidation resistance of the compositions of this invention, an aspect of this invention is an improved article of manufacture having a component intended for use at a temperature of 400°–1600° C. in an oxidizing atmosphere, such as air, $O_2$, steam, or gases containing $CO_2$, $NO_x$, $SO_2$, e.g., the combustion or gasification products of fossil fuels. Examples of such apparatus are turbines, ceramic heat exchangers, jet aircraft components, ect. The improvement in such articles of manufacture is characterized by a component intended for use in the high temperature oxidizing atmosphere being a ceramic composition within the triangular area defined by the points ABCA of the $Si_3N_4$-$SiO_2$-$M_2O_3$ ternary diagram depicted in FIG. 1, and having at least 95% theoretical density, M being selected from the group consisting of Yb, Dy, Er, Sc, and alloys having Yb, Y, Er, or Dy as one component and Sc, Al, Cr, Ti, (Mg+Zr) or (Ni+Zr) as a second component, said alloy having an effective ionic radius less than at least 0.89 Å and preferably less than 0.86 Å.

What is claimed is:

1. A ceramic composition suitable for use as a high-temperature structural material, said composition being within the triangular area defined by the points ABCA of the $Si_3N_4$-$SiO_2$-$M_2O_3$ ternary diagram depicted in FIG. 1, M being selected from the group consisting of alloys having Yb, Y, Er, or Dy as a first component and Sc, Al, Cr, Ti, (Mg+Zr) or (Ni+Zr) as a second component, said alloy having an effective ionic radius less than 0.89 Å.

2. The ceramic composition of claim 1 in which said second component is Sc.

3. The ceramic composition of claim 2 in which the first component is Y.

4. The ceramic composition of claim 1 in which said alloy has an effective ionic radius less than 0.86 Å.

5. In an article of manufacture having a component intended for use at a temperature of 400°–1600° C. in an oxidizing atmosphere, the improvement in which said component comprises the ceramic composition of claim 1 having a density at least 95 percent theoretical density.

6. The article of manufacture of claim 5 in which said second component is Sc.

7. The article of manufacture of claim 5 in which said alloy has an effective ionic radius less than 0.86 Å.

* * * * *